May 15, 1951 — F. A. D'ARTENAY — 2,552,770
HITCH FOR GANGING A PLURALITY OF IMPLEMENTS IN SQUADRON ARRANGEMENT
Filed Nov. 17, 1948 — 2 Sheets-Sheet 2
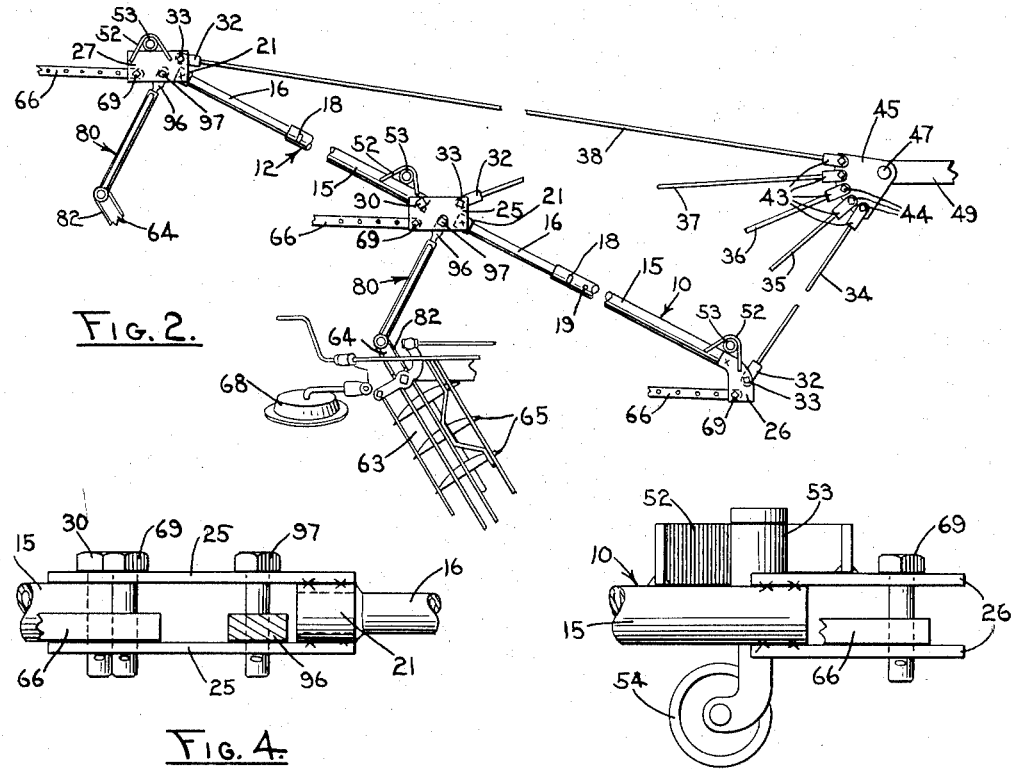
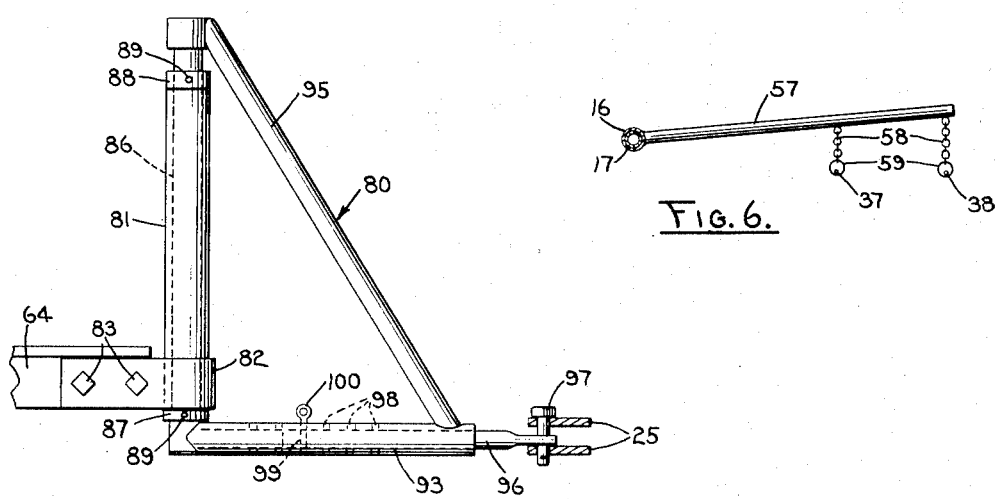
INVENTOR.
FRANCIS A. D'ARTENAY
BY
ATTORNEYS Patented May 15, 1951

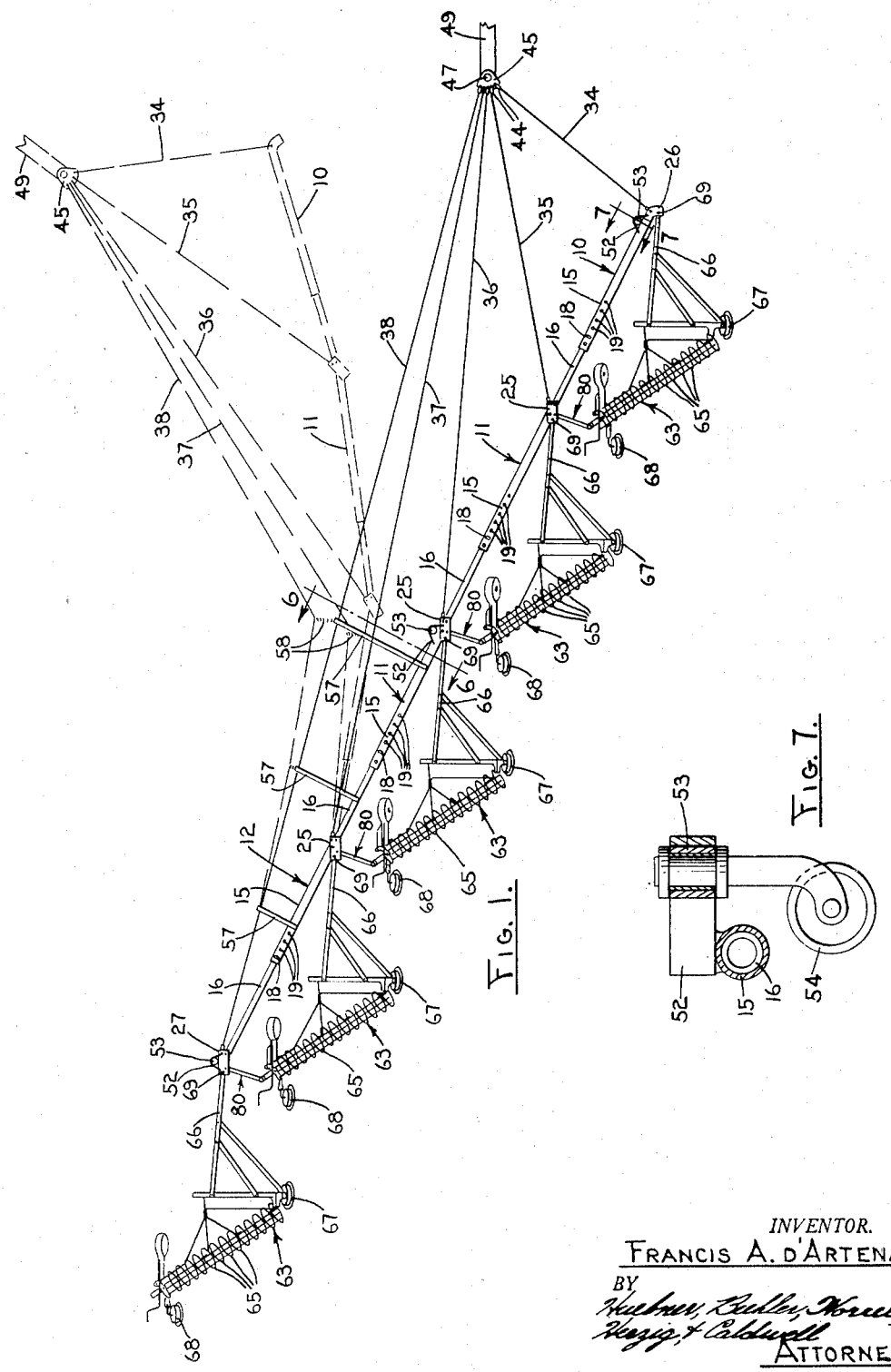

2,552,770

UNITED STATES PATENT OFFICE 2,552,770

HITCH FOR GANGING A PLURALITY OF IMPLEMENTS IN SQUADRON ARRANGEMENT

Francis A. d'Artenay, Stratford, Calif.

Application November 17, 1948, Serial No. 60,528

7 Claims. (Cl. 97—77)

This invention relates to a hitch and more particularly to a hitch for movably connecting a plurality of earth working tools in a squadron whereby they may be drawn by tractor or the like for working the ground simultaneously in a wide swath.

Hitch arrangements for attaching a plurality of harrows or the like in a gang have been heretofore provided which in usual practice do not fully accomplish the desired results. Conventional hitch arrangements fail to connect disc harrows, tillers, cultivators or other agricultural implements arranged in squadron so that each implement follows the next anterior implement in the proper transverse relation to work a continuous uninterupted swath of ground. In the usual or conventional arrangement the implements do not maintain their relative transverse positions and the implements at times as they are drawn over the ground, are excessively overlapped, or excessively spaced whereby the ground is cultivated to an unnecessary extent and/or strips of unworked ground left between the implements. With the usual hitch apparatus, it is quite difficult to make turns in that the construction is cumbersome and the spacing difficulties referred to aggravated. The usual squadron hitches are also quite difficult to assemble and maintain because of their complexity.

Therefore, it is an object of the present invention to provide an improved hitch for connecting a plurality of disc harrows, tillers, cultivators, plows and other agricultural implements to a prime mover in echelon arrangement that is adapted accurately to maintain such implements in their proper transverse positions in the arrangement.

Another object of the present invention is to provide draft means for a plurality of implements in which each implement trails the next anterior implement without undue overlapping and without undue transverse spacing therebetween.

Another object is to provide a hitch for interconnecting in echelon relation a plurality of implements transversely disposed to the normal direction of movement thereof, and having colter wheels at opposite ends thereof, to each other and to a traction device whereby the rearwardmost colter wheels of adjacent ends of adjacent implements accurately track the forwardmost colter wheels of said adjacent ends.

Another object is to provide means for interconnecting a plurality of implements in squadron relation and to a traction device whereby implements may be regulated as to their transverse position relative to the direction of line of draft and located relative to each other for proper tilling of the soil without unnecessary overlapping and/or spacing.

Another object is to provide means for interconnecting a plurality of implements in squadron relation whereby the squadron may readily traverse turns.

Another object is to provide a device of the character described in the preceding paragraph employing traction flexible tension members effectively combined with means for supporting the members located at the inner side of the turn while such turn is being made.

Further objects of the present invention are to provide a draft hitch for a plurality of disc plows and the like which is economical to manufacture; simple to construct, to assemble and to use; and which is effective in motivating said disc plows and the like in working the ground over a wide swath.

Other objects and advantages of the present invention will become apparent in the following description taken in connection with the accompanying drawings, in which:

Fig. 1 is a top plan view of the draft hitch of the present invention connecting a plurality of disc plows for forward motivation in echelon arrangement.

Fig. 2 is a somewhat enlarged, fragmentary top plan view of the hitch, shown in Fig. 1.

Fig. 3 is a fragmentary elevational view of the forward end of a forwardmost beam showing a connection of the draft tongue of the disc plow thereto and a caster support therefor.

Fig. 4 is a fragmentary elevational view of a juncture of adjacent beams showing pivotal connection therebetween and means for pivotally connecting a disc plow thereto.

Fig. 5 is an elevational view of an adjustable pivotal connection between the rear end of each disc harrow and the juncture between the ends of adjacent beams.

Fig. 6 is a vertical transverse sectional view through a portion of one of the beams showing a cable supporting boom extending therefrom, taken along line 6—6 in Fig. 1.

Fig. 7 is a vertical transverse sectional view through a portion of one of the beams and through a caster supporting bearing attached thereto, taken along line 7—7 in Fig. 1.

Referring to the details as disclosed in the drawing and particularly to Fig. 1, the hitch construction comprises a forward beam, indicated generally by the reference numeral 10, a plurality of intermediate beams, indicated by the reference numerals 11, and a rear beam indicated generally by the reference numeral 12. Each of the beams 10, 11, and 12 is preferably adjustably telescopic whereby the hitch of the present invention may be adapted for connection to implements of various types and sizes and angular relations. Each of said beams conveniently comprises a tubular member 15 having a relatively smaller tubular member 16 slidably engaged therein for telescopic adjustment. The larger of the tubes are shown forwardly disposed to the smaller of the tubes. It will be obvious that the reverse arrangement may be employed if desired. Pins 18 are conveniently employed to lock the tubes in adjusted telescopic relation. To this end a plurality of openings 19 are provided in each of the larger, or outer, tubes 15 in longitudinal alignment therein. An opening, not shown, is provided in each of the inner tubes to receive said tube's respective pin. To lock the beams in the desired telescopic arrangement, the opening in the inner tube is juxtapositioned to one of the openings 19 in the outer tube and the pin inserted into the aligned openings. The arrangement described is an expedient structure for dependably locking the beams in the desired lengths and permitting the adjustment of the lengths in a simple and rapid manner.

As shown in Figs. 2 and 4, the rearward end portion of each of the beams 10 and 11 has a sleeve 21 mounted thereon to bring the smaller tubes 16 to the outside diameter of the larger tubes 15. The rearward end of each of the beams 11 and 12 is provided with a pair of vertically spaced horizontally disposed plates 25 welded thereto. Each pair of said plates receives therebetween the forward end portion of the rearwardly adjacent beam of the substantially aligned beams and said beams are articulately connected by a pivot bolt 30 passed through vertically aligned openings in each of the plates in the pairs of plates 25 and through an opening in the forward end of each of the beams located therebetween. Thus the beams are pivotally connected for relative horizontal movements about substantially vertical axes. A pair of vertically spaced horizontally disposed plates 26 are welded on the forward end portion of the beam 10 whereby said forward end of the beam 10 is conveniently connected to a draft appliance, as will subsequently be described. The rearward end portion of the beam 12 has a sleeve 21 weldably mounted thereon, as do the beams 10 and 11, and in turn mounts a pair of vertically spaced horizontally disposed plates 27, similar to the plates 25, as by welding. The pairs of the plates 25, 26, and 27 are conveniently mounted on opposite sides of their respective beams, one plate of each pair being mounted below its respective beam and the other plate being mounted above said beam, as indicated in Figs. 3 and 4.

The plurality of beams are adapted to be interconnected in substantial axial alignment and to be connected to a draft appliance with the forward beam 10 thereof an appreciable distance ahead of the rear beam 12, said beams being located at an angle to the line of draft. This is accomplished by providing a plurality of clevises 32 individually pivotally connected, as at 33, to the pairs of spaced plates 25, 26, and 27. Cables 34, 35, 36, 37 and 38 are individually and fixedly connected to the clevises 32 connected to the plates at the forward ends of the succeeding beams beginning with the forwardmost 10 thereof and to the plates 27 at the rear end of the rear beam 12, respectively. As shown in Fig. 1, the forward cable 34 is the shortest and the cable 38 the longest, the intermediate cables 35, 36 and 37 being of proportional graduated lengths therebetween. The forward end of each of the cables 34 to 38 inclusively, has a clevis 43 attached thereto and each clevis is pivotally connected, as at 44, to a horizontally located arcuate draft plate 45. The draft plate is adapted to be drawn in a forward direction, or toward the right as viewed in Fig. 1, by pivotally connecting the draft plate at 47 to a draft tongue or drawbar 49 of a tractor or other suitable prime mover.

The pivoted beams 10, 11, and 12 are supported for movement over the ground by providing a plurality of brackets 52 each conveniently formed from a strip of metal, such as plate steel, bent to substantially V shape and welded or otherwise secured in forwardly extended position to the forward end of the forward beam 10, the rearward end of the beam 12, and at intermediate supporting position or positions, as desired. A caster bearing 53 is welded in a substantially erect position within the vertex of each plate 52 and has a self aligning swivel caster 54 rotatably mounted therein and extended therebelow. Thus the plurality of beams are supported for ground traversing movement on the casters 54. It is to be understood that in small hitches of the present invention no such support is required and that such supporting may be omitted without departing from the spirit or the scope of the present invention.

While making a turn with the hitch arrangement, which turn if abrupt is preferably made only to the left, the longer cables 37 and 38 have a tendency to sag between the clevises at the opposite ends thereof and means are provided for supporting this pair of cables during such turns by providing a plurality of booms 57 which are secured at their inner ends to the tubular portions of the rearmost beams 11 and 12 and extend substantially horizontally, forwardly and slightly upwardly therefrom. A chain, or plurality of chains, 58 are secured in spaced relationship along each boom and depend therefrom, each having a ring 59 at the lower terminal end thereof through which the cables 37 and 38 are individually threaded. Thus, the intermediate portions of the cables 37 and 38 are supported, as shown in Fig. 1, from sagging extensively, preventing them from dragging on the ground, or moving rearwardly during a turn to become entangled with the drawn implements.

Implements with which the hitch of the present invention is adapted to be employed for motivating purposes are typified by the disc plows shown at 63 in Fig. 1 and fragmentarily in Fig. 2. The disc plows employ a draft frame 64 angularly disposed to the line of draft having a forward right end portion and a rearward left end portion, rotatably mounting a plurality of plow discs 65, having a draft tongue 66 forwardly extended from the frame 64 for motivating purposes, a forward colter disc 67 at the forward right end of the frame 64, and a rearward colter disc 68 at the rearward left corner of the frame 64. It is to be understood that the hitch of the present invention may be employed to provide draft connection between a squadron of implements of other types and designs and with a draft appliance.

The disc plows 63 are arranged in echelon with the forwardmost thereof being connected to the forward end portion of the beam 10 by inserting the tongue 66 of said disc plow between the plates 26 and pivotally connecting the tongue to said plates by passing a bolt 69 downwardly through openings in each of the plates and the forward end portion of the tongue. Succeeding disc plows are connected to the succeeding plates 25 and 27 respectively in the same manner by inserting bolts 69 through openings in said plates and in the forward end portions of their respective tongues. It is to be understood that the tongues may be connected to the plates by means of clevises or other suitable connecting means but that effective operation requires that the connection to the plates be for lateral pivotal movement of the tongues relative to the substantially aligned beams. So connected to the plates 25, 26 and 27, the disc plows may be forwardly motivated by a draft force applied to the draft tongue or drawbar 49, but the individual disc plows are free to drift laterally and thus to experience the conventional difficulty of excessive overlapping in their soil effect and in the leaving of unworked earth between the paths traversed by the individual plows. This difficulty is obviated by the provision of guide means, shown generally at 80, which pivotally interconnect the rearward end portions of each of disc plows 63, except the rearwardmost thereof, with an adjacent plate 25 or 27.

As shown in Fig. 5, each guide means conveniently comprises a tubular bearing 81 mounted in a substantially erect position to the rearward end portion of said guide means' respective frame 64. The bearing may be mounted on the frame in any suitable manner such as by providing a strap yoke 82 binding said bearing to the end of the frame and secured to the frame by bolts 83. A shaft 86 is rotatably mounted in each of the bearings 81 and is held longitudinally therein as by a lower thrust collar 87 circumscribing the shaft in abutting relation to the lower end of the bearing 81 and an upper thrust collar 88 circumscribing the shaft in abutting relation to the upper end of said bearing. The collars are conveniently locked to the shaft, as by means of set screws 89.

A hollow tube 93 is secured to the lower end of the shaft 86 and is radially extended, substantially horizontally, therefrom. A rigid strut 95 interconnects the upper end portion of the shaft 86 and the radially extended end portion of the tube 93 and serves to maintain the shaft and the tube in predetermined angular relation against vertical forces imposed on the radial end of said tube. A rod 96 is telescopically received in the horizontal tube 93 for adjustable radial extension. Said rod has a flattened outer end portion and an opening formed vertically therethrough. The outer end of the rod is inserted between the pairs of spaced plates 25 and 27 to which the guide means 80 is connected and pivotal connection thereto effected by passing a bolt 97 downwardly through openings in the spaced plates and through the opening in the rod 96.

By the construction described, the rear end of each of the disc plows, except the rearwardmost disc harrow, is pivotally connected to the rear end of the respective beam to which the drawbar of said disc plow is pivotally connected at the forward end. The rear end of each of the disc plows, except the rearwardmost disc plow, are adjustably spaced from the rear end of its respective beam by providing a plurality of openings 98 in the horizontal tube 93 and a single opening 99 through the rod 96. A pin 100 is adapted to be located through aligned openings 98 and 99 to lock the rod 96 and tube 93 in adjusted telescopic relation. Thus, the rear end of each of the disc plows, except the rearwardmost thereof, may be laterally positioned relative to the aligned beams whereby the rear colter wheel of each disc plow is located directly ahead of the forward colter wheel of the next following disc plow. This relative lateral positioning of the disc plows has been found desirable in the squadron connection of such implements. The telescopic adjustment of the rods 96 in the tubes 93 may achieve the desired lateral spacing of the disc plows or other implements, to squadrons of which the hitch of the present invention is connected.

*Operation*

In the use of the hitch, as described, the arcuate draft plate 45 is pivotally connected at 47 to the draft tongue or drawbar 49 of a tractor or the like. The cables 34 to 38, inclusive, are of such length that the beams 10, 11, and 12 attached to the rear ends thereof are drawn in substantially longitudinal alignment while the tractor is moving in a forward direction—at an angle to the direction of movement with the beam 10 appreciably forward of the rear beam 12. The individual disc plows, or other implements, are adjusted to achieve the desired depth of soil engagement.

The rear end of each of the disc plows, except the rearmost plow, is pivotally connected by means of the guide means 80 to the rear end of the respective beam to which the draft tongue thereof is attached. This structure may be adjusted as to length whereby the location of the rear end of each of the forward and intermediate disc plows may be regulated relative to the rear end of the respective beam to which it is attached.

While the squadron of disc plows is drawn in a forward direction, the plurality of beams are supported on the swivel casters 54 in rolling contact with the ground, the disc plows till the soil in their usual manner and with the attachment thereof to the pivoted beams described, the adjustable guide means 80 urge each disc plow into a predetermined transverse position relative to adjacent disc plows. Thus, because the plows are connected relatively transversely to each other there is no unintentional overlapping of the tilling of the soil and there is no strip of ground left unworked between the plows in the squadron after it has passed thereover. Any tendency of a disc plow to work from predetermined position relative to adjacent plows is transmitted through its guide means 80 and/or its tongue 66 to the aligned beams 10, 11, and 12 and thence to the other disc plows. This imparts to the squadron desirable flexibility and adaptability without undesirable inaccuracy of cooperative action of the individual plows.

In making a turn, as when the end of a field is reached, turns are preferably made to the left because of the turning characteristics of the individual disc plows. The tractor moves to the left relatively to preceding line of draft, thereby causing all of the cables 35, 36, 37, and 38 to sag, except the shortest cable 34, connected to the forward end of the forward beam 10. The longer cables sag to a greater extent than the shorter cables, in making a turn, hence the provision of the plurality of booms 57 having chain supported rings 59 thereon through which the longer cables 37 and 38 pass. The longer cables 37 and 38 are supported in the rings 59 with the sagging thereof partially distributed between rings whereby they will not sag into ground contact. The cables are thus prevented from interfering with the normal operation of the hitch and/or implements.

From the foregoing description it will be seen that I have devised a hitch for connecting a gang of implements in echelon arrangement whereby the ground may be effectively tilled over a wide swath without overlapping of the individual operations of the implements and without spacing or gaping therebetween leaving a strip of soil untilled or uncultivated. It will also be seen that a hitch has been devised which is economical to manufacture, easy to operate, and easily adjustable to locate the plurality of implements relative to each other.

Although I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent devices and structures.

Having described my invention, what I claim as new and desire to secure by Letters Patent is:

1. A hitch for interconnecting a plurality of forwardly movable implements in squadron arrangement and for connecting said squadron to a draft appliance comprising a plurality of beams arranged in substantially longitudinal alignment pivotally interconnected for relative horizontal angular movement, a plurality of flexible tension means individually connected to opposite ends of the plurality of aligned beams and to the pivotal interconnections of said beams, said flexible tension means being extended sidewardly and endwardly of the beams in convergent relation, means connected to the extended ends of the tension means adapted for connection to a draft appliance, draft connections interconnecting the forward ends of the implements individually to corresponding ends of the beams, and guide means individually interconnecting sides of implements to the opposite ends of their respective beams.

2. A hitch for interconnecting a plurality of forwardly movable implements in squadron arrangement and for connecting said squadron to a draft appliance comprising a plurality of substantially aligned beams; substantially vertical pivot bolts interconnecting adjacent ends of the aligned beams for relative horizontal pivotal movement of the beams; a plurality of flexible tension members having draft connection with opposite ends of each of the beams, said members converging at a position sidewardly removed from the aligned beams; means for connecting the convergent flexible tension members to a draft appliance, said flexible tension members being of graduated length whereby the substantially aligned beams are angularly disposed to the normal direction of movement of the draft appliance and each beam caused to have relatively forward and rearward end portions; means pivotally interconnecting the forward end portions of the implements to the forward end portions of the beams; and guide means pivotally interconnecting the sides of the implements with the rearward end portions of said implements' respective beams.

3. In combination with a plurality of implements having forwardly extended draft tongues; a plurality of substantially aligned beams having adjacent ends pivotally interconnected for relative pivotal movement of the beams about substantially erect axes; flexible tension means connecting the substantially aligned beams to a draft appliance, said beams being angularly disposed to the normal direction of movement of said appliance; means pivotally interconnecting the draft tongues of the individual implements and the forward end portions of the beams; and articulated guide means interconnecting sides of the implements and the rearward end portions of their respective beams.

4. A hitch for interconnecting a plurality of implements in squadron arrangement and said squadron to a draft appliance comprising a plurality of substantially aligned, telescopically adjustable beams pivotally connected for relative horizontal movement, flexible cables attached to the junctures of the beams and to the outer end of each terminal beam, each of said cables being connected at one end to the aligned, pivotally connected beams and the opposite ends of said cables converging at a position spaced from said beams sidewardly from alignment therewith, means for connecting the cables to the draft appliance, draft connections individually interconnecting the forward ends of the implements with corresponding ends of the beams, and guide means individually interconnecting sides of the implements with the opposite ends of their respective beams.

5. In combination with a plurality of implements arranged in echelon relation and each having forwardly extended draft tongues, a plurality of substantially aligned, telescopically adjustable, beams pivotally interconnecting the forwardly extended draft tongues of adjacent implements in predetermined spaced relation, telescopically adjustable articulated means interconnecting a side of each of the implements except the rearwardmost thereof with the end of said implement's beam opposite the end to which its draft tongue is conected, means for supporting the beams for earth traversing movement, a plurality of flexible tension members interconnecting the substantially aligned beams at positions adjacent the connections of the draft tongues thereto and a draft appliance, and boom means horizontally extended from the beams in supporting relation to the cables.

6. A hitch for connecting a plurality of implements in echelon arrangement and said implements to a draft appliance comprising a plurality of substantially aligned longitudinally adjustable beams pivotally connected at their adjacent ends for relative horizontal pivotal motion, a flexible cable connected to each pivotal juncture between each adjacent beam and to the outer ends of each terminal beam, the opposite end of each cable being connected to a common draft means with the beams in substantial alignment and with the plurality of beams at an angle to the direction of movement of the draft means, an implement pivotally connected in trailing relation to the forward end portion of each beam in echelon arrangement, and laterally adjustable guide means individually pivotally connected between a side of the forwardmost implement and each intermediate implement and the rear ends of the respective beams to which said implements are connected.

7. A hitch for connecting a plurality of disc plows in echelon for squadron operation to a draft appliance comprising a plurality of substantially aligned, longitudinally adjustable beams pivoted together at their adjacent ends for relative horizontal movement, a flexible cable connected at the pivotal junctures of the beams and to the outer end of each terminal beam, the forward end of each cable being connected to the draft appliance with the beams in substantial alignment and with the plurality of beams at an angle to the direction of movement of said appliance, a means for pivotally connecting the implements individually in trailing relation to the junctures between the beams and to the outer end of each terminal beam in echelon arrangement, and laterally adjustable guide means individually pivotally connected between the forwardmost implement and each intermediate implement and the rear end of said implement's respective beam, and means attached to the beams for supporting the cables intermediate their respective beams and the draft appliance.

FRANCIS A. D'ARTENAY.

REFERENCES CITED

The following references are of record in the file of this patent:

UNITED STATES PATENTS

| Number | Name | Date |
|---|---|---|
| 911,703 | Clay | Feb. 9, 1909 |
| 1,080,429 | Edwards et al. | Dec. 2, 1913 |